INVENTORS:
Eric Azari
Vernon E. Mondt
Herman J. Malin
By Smyth & Roston
Attorneys INVENTORS.
Eric Azari
Vernon E. Mondt
Herman J. Malin
By Smyth & Roston
Attorneys Dec. 18, 1962 E. AZARI ET AL 3,069,156

CARD TRANSPORT SYSTEM

Filed Aug. 25, 1958 6 Sheets-Sheet 3

INVENTORS:
Eric Azari
Vernon E. Mondt
Herman J. Malin

By Smyth & Roston

Attorneys.

Dec. 18, 1962 E. AZARI ET AL 3,069,156

CARD TRANSPORT SYSTEM

Filed Aug. 25, 1958 6 Sheets-Sheet 4

INVENTORS:
Eric Azari
Vernon E. Mondt
Herman J. Malin
By Smyth & Roston
Attorneys.

Fig. 5
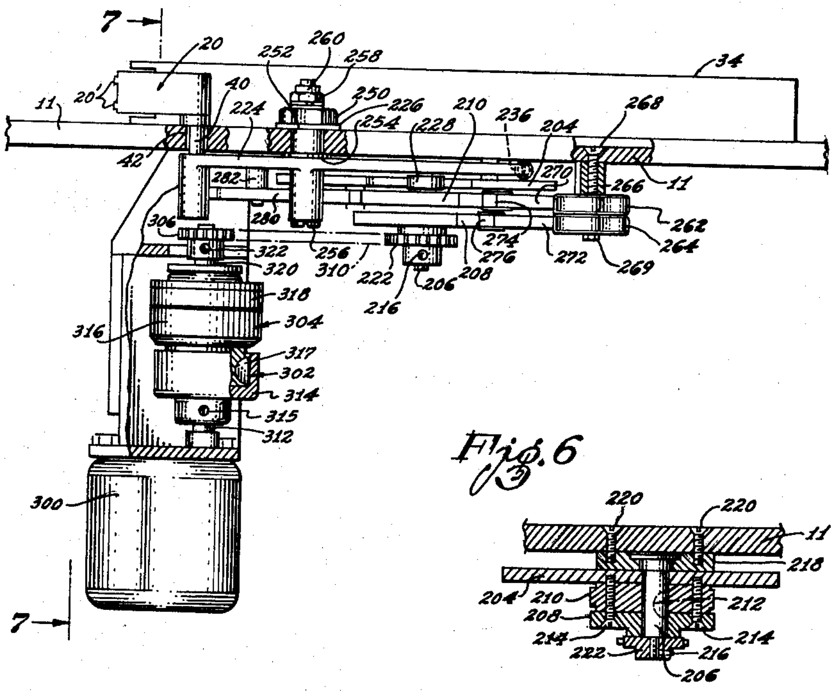
Fig. 5, Fig. 6
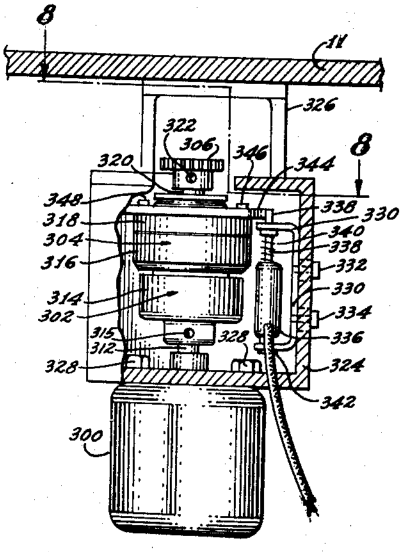
Fig. 7
Fig. 8
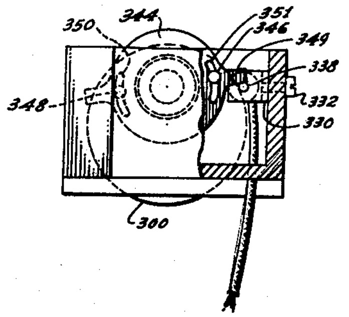
INVENTORS:
Eric Azari
Vernon E. Mondt
Herman J. Malin
By Smyth & Roston
Attorneys INVENTORS:
Eric Azari
Vernon E. Mondt
Herman J. Malin
By Smyth & Roston
Attorneys 3,069,156

CARD TRANSPORT SYSTEM

Eric Azari, Pacific Palisades, Vernon E. Mondt, Los Angeles, and Herman J. Malin, Culver City, Calif., assignors to Magnavox Company, Los Angeles, Calif., a corporation of Delaware Filed Aug. 25, 1958, Ser. No. 756,922
14 Claims. (Cl. 271—5)

The invention relates to apparatus for handling information storage cards, and it relates more particularly to an improved card holding station for use in such apparatus for feeding cards sequentially to a transport medium included in the apparatus. The term "cards" will be used herein to refer to any type of discrete element capable of recording digital information.

Digital techniques have been commonly used in the data processing art to store large amounts of information. In one type of data processing system, the information is stored on a plurality of discrete cards. The information is recorded on the cards in a plurality of rows and columns of binary bits. These bits individually represent a "1" or a "0," and each column of bits corresponds to a "position" of the particular card and represents a multi-digit binary number.

The information may be stored on the cards in the form of magnetic areas of one polarity or another, in the form of holes punched in the cards whose presence or absence represents a binary "1" or a binary "0," in the form black or white markings, or in any other appropriate form. Many thousands of information storage cards of the type under discussion are used in complex data processing systems or card processing systems in order that the millions of binary bits which are required to record the information may be properly stored. The information storage cards may be housed in a stacked relation in a plurality of magazines, and the magazines themselves may be stored in suitable racks. For processing purposes, a magazine of cards is selected and placed in a card holding station which is included in the card processing apparatus.

The information storage cards are maintained in a stacked relationship in the card holding station, and they are sequentially fed to a transport medium which also is included in the card processing apparatus. This transport medium may, for example, be a rotatable vacuum pressure drum which exerts a vacuum pressure at its periphery. The transport drum is capable of receiving cards from the card holding station and of carrying the cards at fixed positions on its periphery. Such a transport drum will be described subsequently in the specification. It will become evident, however, as the present description proceeds that other types of transport media for the cards can also be used.

The cards are carried by the transport medium past appropriate transducer means for processing purposes. Upon the completion of the processing operation, the cards are returned either to the same card holding station or to other card holding stations for subsequent use. However, such an operation requires that the card holding station be capable of being operated in a feeding mode in which the cards are fed out of it to the transport medium, and of also being operated in a stacking mode in which the cards are stripped from the transport medium and stacked in the station. Only with such a reversible two-mode card holding station, can cards be conveniently returned to the same station in their original order at the termination of the processing operation.

Such a reversible card holding station is described and claimed, for example, in copending application Ser. No. 538,111 which was filed October 3, 1955 in the name of Robert M. Hayes, which issued July 8, 1958, as Patent 2,842,362. The apparatus described in this copending application permits the card processing apparatus to be simplified to a large extent and increases the flexibility in the system operations. The apparatus of the copending application enables information storage cards to be fed from a particular card holding station to the transport medium for processing, and then to be returned to the same card holding station after the processing has been completed. This operation may be completely automatic. The apparatus of the copending application also permits a convenient interchange of cards between two reversible card holding stations for sorting or collating purposes.

The reversible card holding station of the copending application 538,111 uses mechanical linkage and mechanically operated members to accomplish its feeding-stacking function.

A later copending application Ser. No. 645,639 was filed March 12, 1957 in the name of Alfred M. Nelson et al., now U.S. Patent No. 2,969,979. This latter copending application also provides a reversible feeding-stacking card holding station. The card holding station of the latter application, however, uses pneumatic means rather than mechanical linkages to retain the cards in the station and to control the feed of cards from the station to the transport medium. This latter card holding station includes a vacuum pressure feed head which is movably mounted and which is cam operated between an operating position and a stand-by position.

When the card holding station of the copending application Ser. No. 645,639 is in a feeding mode, the feed head is moved from the stand-by position to the operating position. When the feed head is in the operating position, a vacuum pressure may be controllably provided at its card-engaging surface. This vacuum pressure is exerted against the leading card in the station which rests against the card-engaging surface of the feed head. The vacuum pressure at the surface of the feed head is made sufficient to overcome the tendency of the transport medium to withdraw the leading card out of the station. As will be described, a portion of the leading card also engages the transport medium and the transport medium exerts a vacuum pressure against that portion and tends to draw the leading card out of the card holding station.

A solenoid-controlled valve is disposed in the feed line which provides the vacuum pressure to the card-engaging surface of the feed head of the card holding station in copending application 645,639. By periodically energizing the solenoid valve to interrupt the vacuum pressure at the card-engaging surface of the feed head, the cards in the card holding station can be released at will to the transporting medium. Interruption of the vacuum pressure is normally made for a time interval which is just long enough to permit a single card to be released from the card holding station to the transport medium. The vacuum pressure at the feed head is reestablished before the second card can be drawn out of the card holding station. However, when it is desired to "free run" the cards out of the station, it is merely necessary to continually energize the solenoid valve. This interrupts the vacuum pressure at the card-engaging surface of the feed head, and the cards move one after another out of the station.

When the card holding station of the copending application Ser. No. 645,639 is conditioned to a stacking mode, the feed head is moved back to its stand-by position and a stack head is moved forward from a stand-by position to an operating position. When the stack head is in its operating position, it is capable of stripping cards from the transport medium and of stacking the cards in the card holding station.

The card holding station of copending application 645,639 has been used successfully in a wide variety of types of card processing systems and apparatus. Certain difficulties and problems have been encountered, however, in controlling the release of the cards by the feed head under certain particular conditions and especially for high speed operations. It has been found, for example, that the card-engaging surface of the feed head should have a relatively high coefficient of friction in order that the cards may be retained in the card holding station without the requirement of excessively high vacuum pressures at that surface. However, when a card is released from a feed head with a high friction card-engaging surface, the resulting drag on the card by the card-engaging surface of the feed head materially retards the removal of the card from the station.

It has been necessary, therefore, in the prior apparatus to balance the coefficient of friction of the feed head card-engaging surface against certain other factors. These factors include the rate at which it is desired for cards to be moved out of the station and also include the maximum practical vacuum prsssure that can be used to retain the cards in the station.

The present invention solves the problems discussed above by the provision of a combination including a feed head-valve assembly which is capable, not only of providing a vacuum pressure but also of providing a pressurized fluid at the card-engaging surface of the feed head. The vacuum pressure is provided when it is desired to retain cards in the card holder, and the pressurized fluid such as air under pressure is provided at the card-engaging surface of the feed head when it is desired to release a card. This permits the feed head surface to have a relatively high coefficient of friction to render it capable of retaining cards in the station without the need for an excessive vacuum pressure to be used. Then, when a card is to be released, sufficient positive pressure is immediately produced at the card-engaging surface of the feed head to overcome the frictional drag that the surface would normally exert against the card being released. This enables the released card to be quickly removed from the station.

The embodiment of the invention to be described utilizes a modified construction of the bi-stable valve disclosed and claimed in copending application Ser. No. 685,581 filed September 23, 1957 in the name of Alfred M. Nelson et al., now U.S. Patent No. 3,001,549. The valve of the copending application is capable of being operated at an extremely high rate of speed, and this characteristic renders this type of valve ideally suited for the present purposes. Valves of the general type disclosed in the copending application have been operated, for example, at rates of at least 150 open-close valve operations a second. Also, the response time of this type of valve is such as to provide, for example, a full flow of pressurized fluid through the valve in less than 2 milliseconds after the application of a control pulse to open the valve.

The bi-stable valve assembly disclosed and claimed in the copending application includes a permanent magnet which is mounted in a valve housing and which defines an air gap. A resilient spider is supported in the valve housing, and this spider serves to center a coil form in the air gap of the permanent magnet for reciprocal axial movement in the gap. An inlet port introduces pressurized fluid, such as air, into the housing. The housing also includes a pair of exhaust ports which terminate respectively in valve seats on opposite sides of the spider. The spider carries a double-acting valve closure member which is positioned to close with one of the valve seats or the other depending upon the flexure of the spider.

When a current pulse of one polarity is passed through a winding on the coil form, the valve closure member is snapped into a stable closed relationship with one of the valve seats. This relationship is maintained until a current pulse of the opposite polarity is passed through the winding. Then the closure member is snapped into a stable closed condition with the other valve seat.

In the modified valve assembly used in the combination of the invention to be described, the valve closure member is supported on a connecting rod which, in turn, is supported on the spider. The closure member is positioned to close an exhaust port when the spider is flexed to one position by a current flow through the winding and to close a vacuum pressure inlet port when the spider is flexed to its other position by a reverse current flow in the winding. A common channel leads from these ports to the feed head so that a vacuum pressure is introduced to the card-engaging surface of the feed head when a current pulse of one polarity is passed through the winding, whereas a positive pressure is introduced to the card-engaging surface of the feed head when a pulse of opposite polarity is passed through the winding. The constructional details of the valve assembly will be fully described in the following specification.

The particular valve assembly which will be described fully accomplishes the desired result of the invention and, due to the extremely rapid action of the valve, the transition from a vacuum pressure to a positive pressure at the card-retaining surface of the feed head is almost instantaneous. Therefore, the released cards can be drawn from the station with practically no lost time.

Other features and advantages of the invention will become apparent from the following specification when taken in conjunction with the accompanying drawings in which:

FIGURE 1 is a top plan view of a simplified card processing apparatus incorporating reversible feeding-stacking card holding stations constructed in accordance with the invention, this view illustrating a pair of such reversible card holding stations disposed in contiguous relationship with a rotatable vacuum pressure transport drum; one of the stations being shown in a stacking mode for depositing cards from the drum into its card holder, and the other station being shown in a feeding mode for feeding cards from its card holder to the transport drum;

FIGURE 2 is a sectional view substantially on the line 2—2 of FIGURE 1 showing the constructional details of the rotatable drum of FIGURE 1, this sectional view illustrating the manner in which the drum may be controlled to establish a vacuum pressure at its peripheral surface in order that the information storage cards may be firmly held on that surface for transportation from one station to another in the card processing apparatus;

FIGURE 3 is an enlarged perspective view of one of the reversible card holding stations of FIGURE 1, this view illustrating more clearly the details of the transfer mechanism incorporated in the card holding station which includes a feed head constructed and controlled in accordance with the concepts of the present invention;

FIGURE 4 is a bottom view of one of the reversible card holding stations of the apparatus of FIGURE 1 revealing a rotatable cam mechanism which is incorporated in the apparatus and which actuates the feed head and the stack head of the station, this cam mechanism functioning to bring the feed head into an operative position as the stack head is moved to a stand-by position for one operational mode of the station, and to bring the stack head into an operative position while the feed head is moved to a stand-by position for a second operational mode of the station;

FIGURE 5 is a side view, partially in section, of one of the reversible card holding stations of FIGURE 1, this side view particularly illustrating the driving means for the cam mechanism of FIGURE 4;

FIGURE 6 is a fragmentary side sectional view of the reversible card holding station showing how the cam mechanism of FIGURE 4 is mounted on a rotatable cam shaft;

FIGURE 7 is another view, partially in section, of the driving means for the cam mechanism and is taken substantially on the line 7—7 of FIGURE 5 and particularly shows a clutch for coupling the drive motor to the cam shaft referred to above for operating the cam mechanism and also shows a solenoid means for controlling the clutch;

FIGURE 8 is a view, partially in section, taken substantially on the line 8—8 of FIGURE 7 to show further details of the clutch mechanism referred to above;

Figures 9, 10, 11, 12, 13:
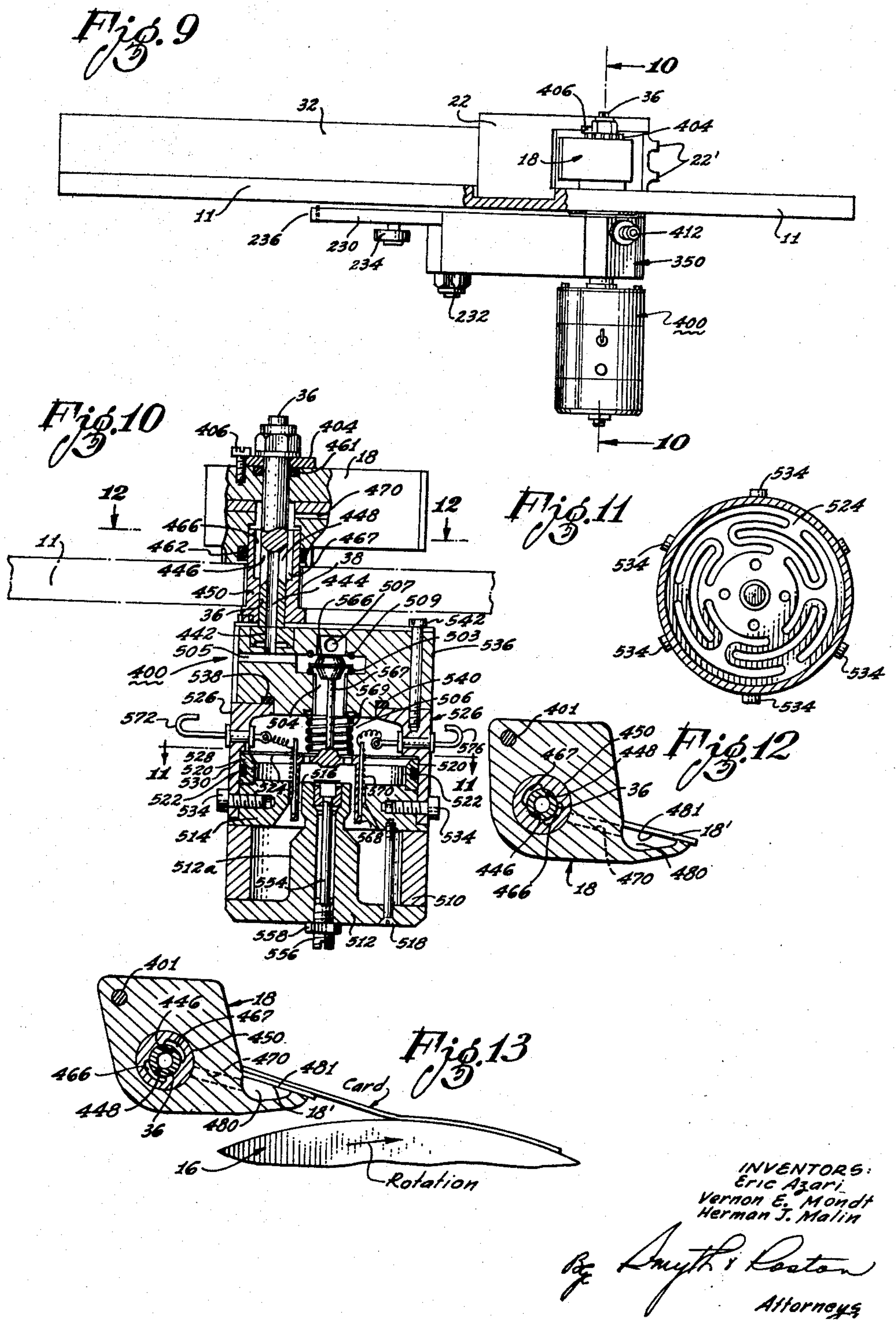
FIGURE 9 is another side view of the card holding station, partially in section, taken from the opposite side from the view of FIGURE 5 and showing particularly the elements which make up the feed head and how these elements are mounted in the station.
FIGURE 10 is a side sectional view of the feed head assembly, and this view shows particularly the details which make up the internal valve mechanisms of the feed head to permit a vacuum pressure to be exerted in one operational mode at the feed head's card-engaging surface and to permit a positive pressure to be exerted at that surface in a second operational mode.
FIGURE 11 is a cross-sectional view taken substantially on the line 11—11 of FIGURE 10 to show the composition of a resilient spider which is incorporated in the feed head assembly for reasons to be explained.

FIGURE 12 is a sectional view of the feed head of FIGURE 10 substantially on the line 12—12 of FIGURE 10, showing the means whereby an internal valve cuts off the vacuum pressure or positive pressure to the card-engaging surface of the feed head when the feed head is retracted to its stand-by position; and FIGURE 13 is a view similar to FIGURE 12 but showing the feed head moved into an operative position and supporting an information storage card, the feed head providing a vacuum pressure at its card-engaging surface to prevent the withdrawal of that card by the associated transport medium.

Figure 1:
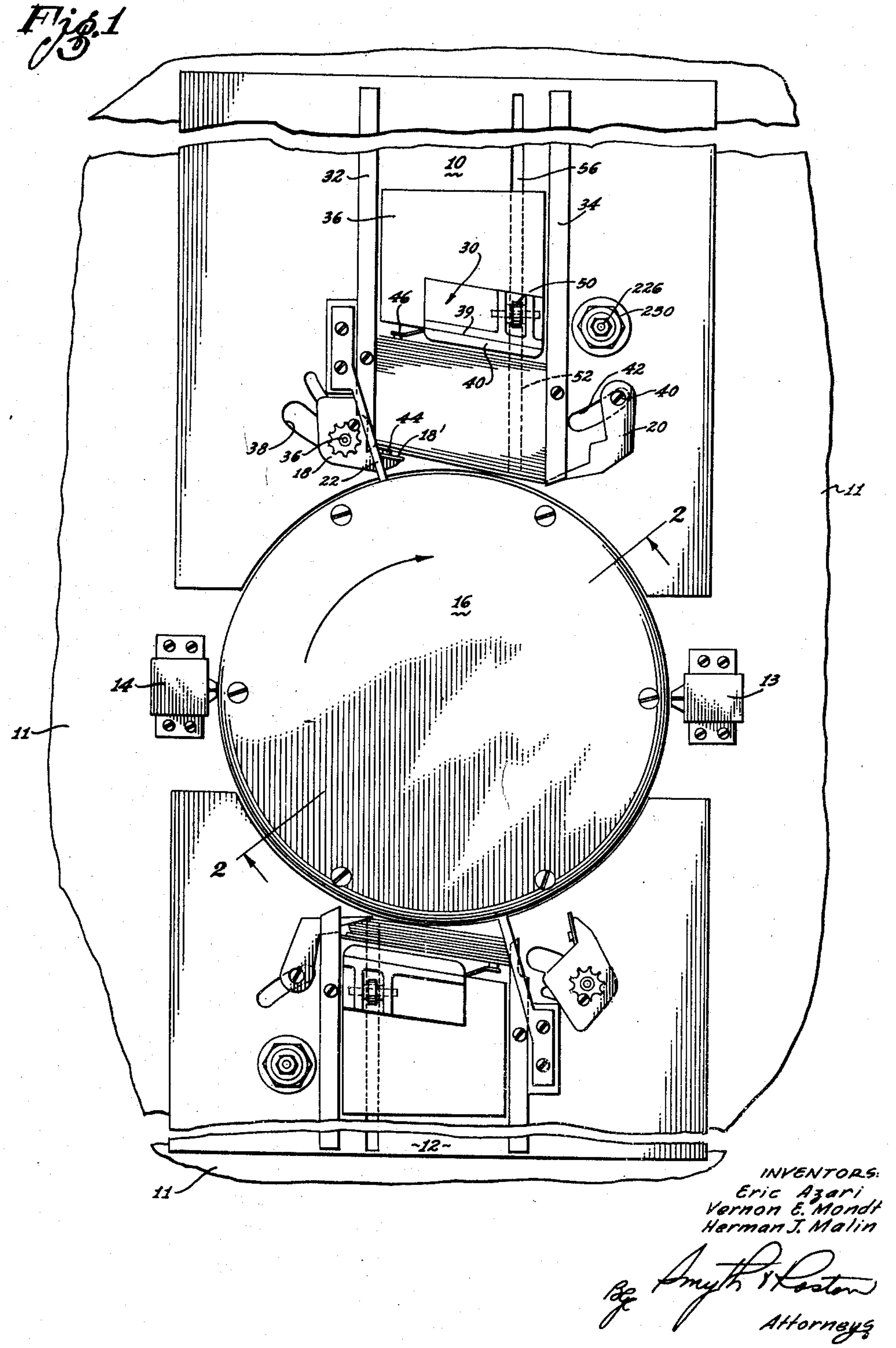

In the apparatus of FIGURE 1, suitable transport means is provided. The transport means for the card is preferably movable although transport means capable of providing movement of cards without any moving parts are also known. One type of transport means may have the form of a rotatable vacuum pressure drum 16. The drum 16 is mounted on a horizontal table top 11 for rotation in a clockwise direction in FIGURE 1 about a vertical axis. The drum may be constructed in a manner to be described so that it exerts a vacuum pressure at its peripheral surface. This vacuum pressure enables the drum to firmly retain transported information storage cards at fixed angular positions about its periphery so that these cards may be carried by the drum from one station to another.

The rotatable transport drum illustrated in FIGURE 1 represents merely one means by which the cards can be transported from one station to another. It will be appreciated that other transport means may also be used.

A first card holding station 10 is mounted on the table top 11 with its mouth adjacent the periphery of the transport drum 16. A second card holding station 12 is also mounted on the table top 11 diametrically opposite the card holding station 10. The card holding station 12 also has its mouth disposed adjacent the transport drum 16. A first transducer means 13 is mounted on the table top 11, and this transducer means is positioned between the card holding stations 10 and 12. A second transducer means 14 is also mounted on the table top 11, and the second transducer means is shown as being on the opposite side of the drum 16 from the transducer means 13.

The transducer means 13 and 14 may be any suitable and well known type of electromagnetic transducer head or plurality of heads. For example, these transducer means may be constructed in a manner similar to that described in copending application Ser. No. 688,202 filed October 4, 1957 in the name of Eric Azari et al., now U.S. Patent No. 3,029,021. The transducer means, of course, may be any other suitable type of electromagnetic transducer. Moreover, when other types of recordings are used on the information storage cards, these transducer means may, for example, be of the mechanical, photoelectric or any other appropriate type.

The card holding station 10 has a movable vacuum pressure feed head mounted adjacent its leading wall 32. The card holding station also includes a stack head 20 which is movably mounted adjacent its trailing wall 34. The construction and operation of the feed head 18 will be described in detail subsequently. The construction and operation of the stack head 20 may be similar to that described in copending application Ser. No. 645,639 referred to above.

The feed head 18 is controlled in a manner to tbe described to exert a vacuum pressure at its card-engaging surface 18' when the card holding station 10 is in its feeding mode and the feed head is move forward to its operative position in which it extends partially across the mouth of the card holding station. This vacuum pressure is exerted on the trailing portion of the front face of the leading card in the card holding station. The leading portion of the front face of this card rests on the peripheral edge of the drum 16 and the drum also exerts a vacuum force on the card. The stack head 20 at this time is withdrawn to its stand-by position.

The vacuum force exerted by the drum 16 tends to withdraw the leading card from the card holding station 10, whereas the vacuum force exerted on the card by the surface 18' of the feed head tends to retain the card in the card holding station. The vacuum force exerted by the feed head 18 is made the greater of the two, so that this vacuum force is able to overcome the vacuum force exerted on the card by the drum 16. So long as the leading card is held in this manner in the card holding station 10, the other cards supported in a stacked relationship in the station behind the leading card are also held in place in the station. The cards are so held in a generally stacked relationship in the station with their lower edges resting on the surface of the table top 11.

Whenever the vacuum pressure to the card-engaging surface 18' of the feed head is replaced by a positive pressure, in a manner to be described, the leading card in the station is immediately withdrawn by the drum 16. The use of the positive pressure permits the surface 18' to have a relatively high coefficient of friction so that the leading card may be held in the station against the tendency of the drum 16 to withdraw it without the requirement for an excessively high vacuum pressure. Then, when the card is released, the positive pressure overcomes any frictional drag that the surface 18' would otherwise exert on the card, so that the card may be quickly and easily removed from the station.

The trailing wall 34 of the card holding station forms in a manner to be described a throat with the periphery of the drum 16. The width of this throat is such that only one card at a time can be passed from the card holding station to the transport drum upon the interruption of the vacuum pressure at the card-engaging surface of the feed head 18. The interval of the interruption in the vacuum pressure to the feed head 18 may conveniently be such that only one card at a time is released from the card holding station to the drum 16. The next card in the station now comes to the leading position and the subsequent card may then be retained in the station by the feed head 18 until the next replacement of its vacuum pressure by a positive pressure. Alternately, and as noted above, the feed head vacuum pressure may be interrupted for a longer period of time so that the cards may be "free run" from the station 10 in a one-by-one sequence to the transport drum 16.

Figure 3:
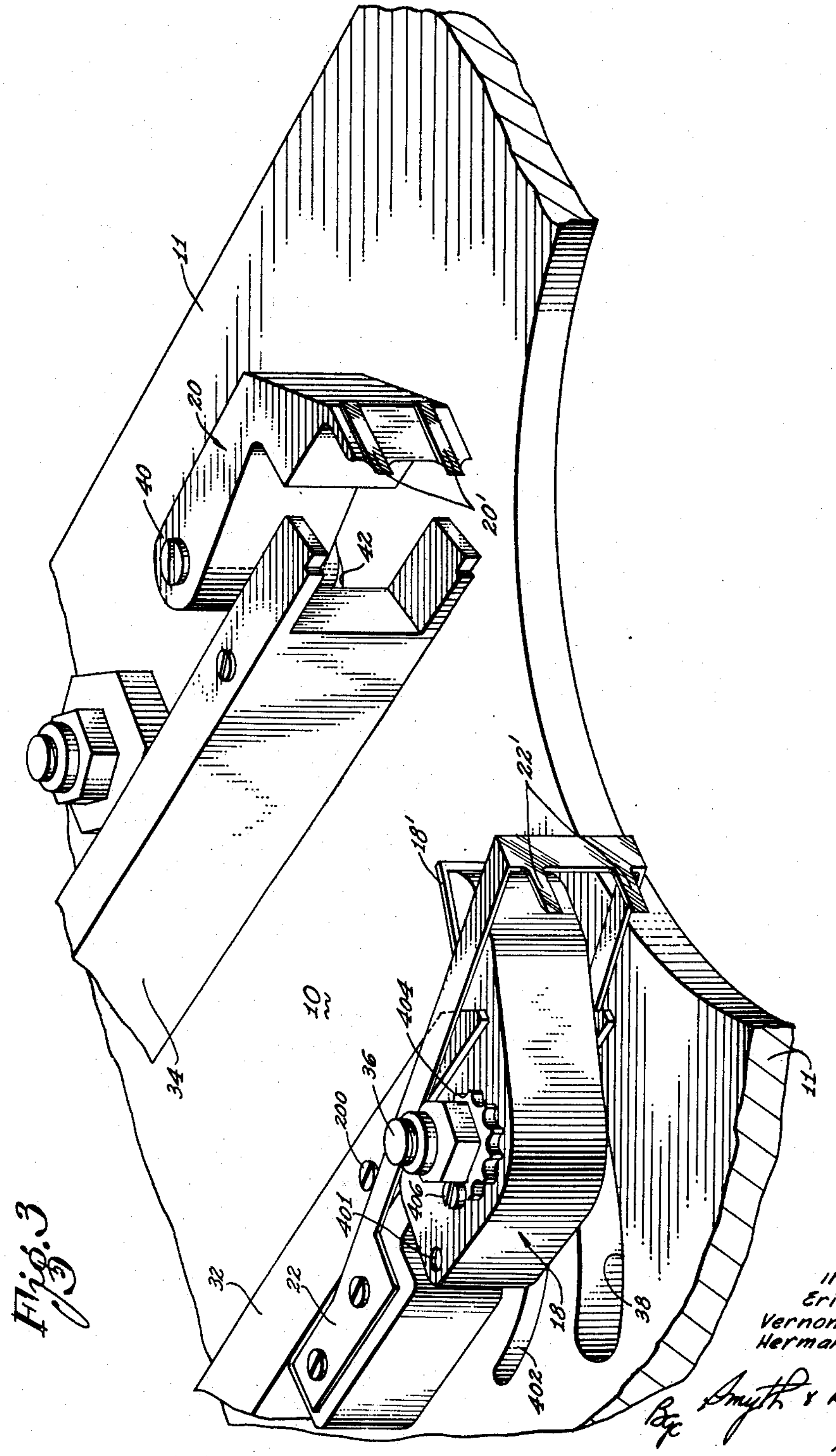

In the stacking mode of operation of the card holding station 10, the feed head 18 is withdrawn to a stand-by position, and the pressure at its card-engaging surface 18' is turned off in a manner to be explained. Simultaneously, the stack head 20 is moved to its operative position at which it fills the throat between the tip of the wall 34 and the periphery of the transport drum 16. The stack head has a pair of fingers 20' (FIGURE 3) which enter annular peripheral grooves in the transport drum 16, and any cards transported to the mouth of the station 10 when the stack head is in its operative position are engaged by these fingers and such cards are arrested by the stack head.

A pick-off member 22 is mounted adjacent the leading wall 32 of the card holding station 10. This pick-off member has a pair of fingers 22' (FIGURE 3) which extend into the peripheral channels or grooves which are formed about the periphery of the transport drum 16. The fingers of the pick-off member 22 are arcuate in shape and have intermediate portions which are displaced radially outwardly from the periphery of the drum 16. This configuration of the fingers of the pick-off member causes the cards transported by the drum to ride over the fingers and to be lifted outwardly from the periphery of the drum. Then, as each card is arrested by the stack head 20, its trailing edge projects tangentially to the periphery of the drum and over the fingers of the pick-off member 22. The next succeeding card transported by the drum will then ride over the fingers of the pick-off member 22 and under the preceding card, in a manner to pry the preceding card from the periphery of the drum. The succeeding card is then arrested by the stack head and the preceding card becomes deposited in the card holding station 10. In this manner, the card holding station is conditioned to its stacking mode in which cards transported by the drum 16 to the stack head are deposited in the station.

The card holding station 12 may be constructed in a manner similar to the construction of the card holding station 10, and for that reason, its components are not numbered in FIGURE 1 and will not be individually described. As mentioned previously, the card holding station 10 is illustrated in FIGURE 1 in its feeding mode in which the feed head 18 is moved forward to an operating position and the stack head 20 is withdrawn to a stand-by position. The card holding station 12, on the other hand, is illustrated in FIGURE 1 as being in a stacking mode in which its stack head is moved forward to an operating position and its feed head is withdrawn to a standby position.

The feed head and stack head of each of the card holding stations 10 and 12 are operated by an appropriate system of cams and levers, which will be described. It will be evident, however, that any suitable control can be used to control the feed heads and the stack heads between their operative position and their stand-by positions at the proper times. For example, the control described in copending application Serial No. 764,066 filed September 29, 1958 in the name of Eric Azari et al., now U.S. Patent No. 2,983,507, may be used.

The card holding station 10 in its feeding mode of operation may contain a stack of information storage cards which are supported in the station in an upright manner. In the feeding mode, the station 10 is conditioned to controllably feed the cards in a one-by-one sequence to the periphery of the transport drum 16. The card holding station 12 at this time is in its stacking mode so that cards transported to its stack head are deposited in that station. The cards from the card holding station 10 may now be controllably fed to the periphery of the transport drum 16 and transported by that drum past the transducing means 13 for processing. Such processing, for example, may constitute either reading data already recorded on the cards, or recording new data on the cards. After processing of the cards by the transducing means 13, they may be deposited in the card holding station 12. Of course, many other operations may be made in the handling of the cards in the different types of processing systems and apparatus.

At the completion of the operations described in the preceding paragraph, the card holding station 10 becomes empty, with all cards having been transferred to the card holding station 12. At such a time, the operational modes of the two stations 10 and 12 may become reversed so that the cards may be returned in their original order to the card holding station 10. The cards may be further processed by the transducer 14 as they are so returned to the card holding station 10.

A pusher member 30 is included in the card holding station 10, and a similar pusher member is included in the station 12. The pusher member 30 is adapted to move along the floor of the card holding station 10 between the spaced parallel walls 32 and 34 which, as noted, constitute the leading and trailing side walls of the station with respect to the movement of cards on the drum 16. These walls are spaced apart a distance corresponding essentially to the length of the cards supported in the station 10.

The purpose of the pusher member 30 is to maintain the cards in stacked relation in the card holding station 10. To accomplish this purpose, the pusher member is biased in the direction of the mouth of the station to resiliently urge the cards toward the mouth of the station. This is so that the leading card may rest against the card-engaging surface 18' of the feed head 18 and against the peripheral surface of the drum 16 when the station is in its feeding mode, and so that the leading card will rest against the stack head 20 and against the pick-off 22 when the station is in its stacking mode.

The pusher member 30 maintains the cards upright in a stacked condition in the card holding station 10, as noted above, and as the cards are fed out of the card holding station, the pusher member moves forwardly to exert a continuous pressure on the cards to hold them in a stacked relationship in the station. Alternately, when cards are fed into the card holding station 10, the pusher 30 is moved backwardly against its spring pressure so that it still exerts a positive force on the cards in the station to maintain them in a stacked relation.

The pusher member 30 may be of the type described in detail in the copending application of Alfred E. Gray, Ser. No. 641,752, which was filed February 21, 1957, now U.S. Patent No. 2,956,803. As fully described in that application, and as shown in FIGURE 1, the pusher includes a bracket 39 which is secured to a base plate 36, the base plate being adapted to slide back and forth along the floor of the card holding station 10. A suitable resilient pad 40 is mounted on the front of the bracket 39, and this pad bears against the trailing card in the station.

The bracket 39 carries a switch armature 46, and this armature electrically closes a pair of switching contacts 44 on the card-engaging surface 18' of the feed head 18 when the last card is fed from the station 10 to the periphery of the drum 16. This engagement of the switch armature with its switching contacts, facilitates the electrical control of the movements of the feed head and stack head of the station, this control being described in copending application Ser. No. 645,639 referred to above.

The bracket 39 of the pusher 30 also supports a rotatable member 50 (FIGURE 1) which extends into a slot in the base plate 36 of the pusher. A resilient spring strip 52 extends upwardly through a slot 56 in the floor of the card holding station and around the rotatable member 50. This resilient strip has a tendency to coil itself into a coiled configuration, and in so doing causes the rotatable member 50 to rotate and resiliently bias the pusher 30 toward the mouth of the station 10. In this manner, the stack of cards in the station 10 is continuously urged toward the mouth of the station and the cards are held in an upright stacked condition.

Figure 2:
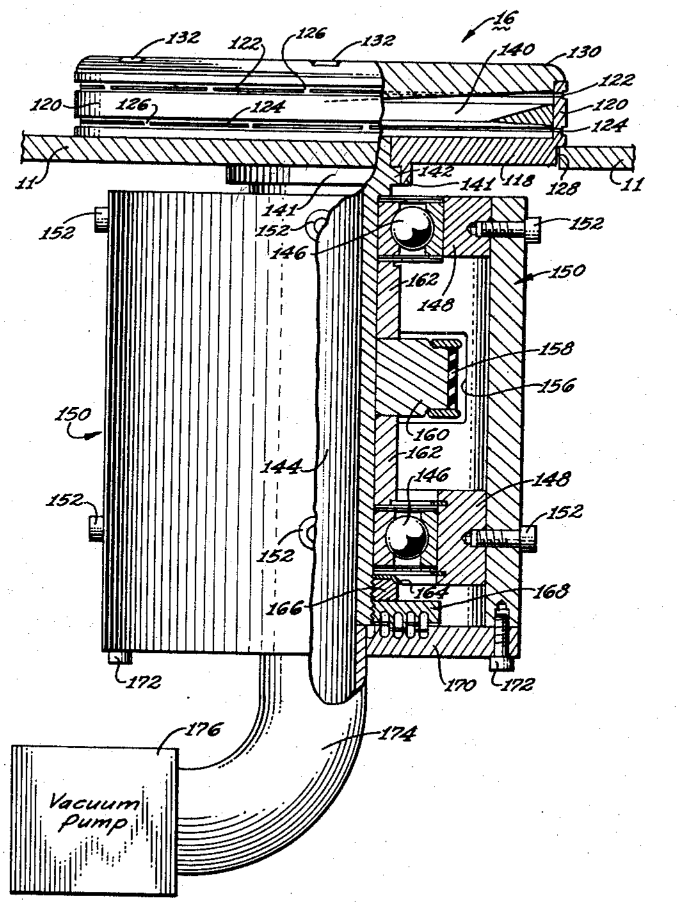

Details of the vacuum transporting drum 16 are shown in the view of FIGURE 2. The illustrated drum is similar in its construction to the rotatable transporting drum disclosed and claimed in copending application Ser. No. 600,975 filed July 30, 1956 in the name of Loren R. Wilson, now U.S. Patent No. 2,883,189. However, it should be appreciated that other types of rotatable drums may also be used.

As shown in FIGURE 2, the vacuum transport drum 16 is made up of a lower section and an upper section. The lower section includes a disc-like bottom portion 118 and an integral annular side portion 120. The disc-like bottom portion and the annular side portion together make up the lower section of the drum.

A pair of axially spaced peripheral orifices 122 and 124 extend through the annular side portion 120. Each of these orifices is discontinuous in that it is interrupted at selected intervals about its angular length by ribs 126 which are integral with the side portion 120. The orifices 122 and 124 each has an external peripheral annular channel for receiving the fingers 20′ of the stack head 20 and the fingers 22′ of the pick-off 22, these fingers being shown in FIGURE 3 and described above. As noted, this engagement of the fingers 20′ of the stack head and of the fingers 22′ of the pick-off with the annular channels in the drum permits the cards to be removed from the periphery of the drum and deposited in the station 10.

The disc-like bottom portion 118 of the lower section of the drum is undercut as shown at 128. This enables the edge of the table top 11 to extend beyond the outer limits of the annular side portion 120. Therefore, even without excessively close tolerances between the edge of the table top 11 and the rotating surface of the drum 16, the cards supported endwise on the table top in the card holding stations 10 and 12 have no tendency to slip down between the table and the drum 16 as these cards are transferred to and from the periphery of the drum. There is, therefore, no tendency for the cards to become mis-placed or damaged.

The upper section of the drum 16 is in the form of a disc-like member 130 which engages the annular side portion 120 of the lower section. The member 130 forms an enclosure with the lower section of the drum, with the member 130 being positioned parallel to the disc-shaped bottom portion 118 of the lower section. The member 130 is held in place on the annular side portion 120 by a plurality of screws 132.

A deflector ring 140 is supported within the interior of the drum 16 in press fit with the inner surface of the annular side portion 120. This deflector ring is tapered toward the center of the drum to prevent turbulence and to provide a streamlined path for air that is drawn in through the orifices 122 and 124.

The bottom portion 118 of the lower section of the drum 16 contains a central opening which is surrounded by an annular collar 141. The collar 141 surrounds a shoulder 142 which is provided at one end of a hollow shaft 144. The drum 16 is supported on the shoulder 142, and the end of the shaft 144 extends into the opening in the bottom portion 118 in press fit with that portion. Therefore, rotation of the hollow shaft 144 causes the drum 16 to rotate. Also, the interior of the hollow shaft 144 communicates with the interior of the drum.

A pair of bearings 146 are provided at opposite ends of the shaft 144. The inner races of these bearings are mounted on the shaft, and their outer races are held by bushings 148. The bushings are secured to a housing 150 by means of screws 152. An arcuate opening 156 is provided in the housing 150 between the bearings 146. This opening enables a drive belt 158 to extend into the housing and over the pulley 160. The pulley 160 is keyed to the shaft 144 between the bearings 146, and it is held against axial movement by a pair of sleeves 162 which are supported on the shaft between the bearings 146.

In this way, the shaft 144 and the drum 16 can be rotated by a suitable motor (not shown) the motor being mechanically coupled to the pulley 160 by the drive belt 158.

The bearings 146 and the sleeve 162 are held on the shaft 144 by a nut 166. This nut is screwed on a threaded portion at the lower end of the shaft, and a lock washer 164 is interposed between it and the lower bearing 146. A sealing disc 168 is also screwed on the threaded portion at the lower end of the shaft 144. The disc 168 operates in conjunction with a bottom plate 170 to prevent the movement of air between the interior of the housing 150 and the interior of the hollow shaft 144 when a pressure differential exists between the housing and the shaft.

The bottom plate 170 is fastened to the housing 150 by a plurality of screws 172, and this plate serves to close the lower end of the housing. A circular central opening is provided in the bottom plate 170, and a hollow conduit 174 extends into the opening in press fit with the plate 170. The conduit 174 is axially aligned with the hollow shaft 144 so that air may be exhausted by a vacuum pump 176 from the hollow interiors of the shaft and the conduit. The vacuum pump 176 may be of any suitable known construction and, for that reason, is shown merely in block form.

The vacuum pump 176 draws air inwardly through the orifices 122 and 124, through the interiors of the drum 16, down the shaft 144 and through the conduit 174. This creates a vacuum pressure at the outer peripheral surface of the annular portion 120 of the lower section of the drum. This vacuum pressure serves to firmly retain the cards received from the card holding stations on the periphery of the drum as such cards are transported by the drum between these two stations.

Detailed constructional features of the reversible card holding station 10 are shown in FIGURES 4 to 9, inclusive. As more clearly shown in FIGURE 4, a cam 204 for moving the feed head 18 and the stack head 20 is keyed to a cam shaft 206 to be rotatable on the underside of the table top 11. A pair of switch actuator cams 208 and 210 may also be mounted on the cam shaft 206 in coaxial relationship with the cam 204.

As best shown in FIGURE 6, the cams 204, 208 and 210 are keyed to the cam shaft 206 by means of a key 212. The cams are held together by a plurality of screws such as the screws 214 and they are held on the shaft 206 by a sprocket wheel 222.

As described in the copending application Ser. No. 645,639, the switch actuator cams are used to control a group of switches 262, 264 and 280 (FIGURE 4), and these switches may be used to actuate certain electronic controls for conditioning the card holding station 10 between its feeding mode and its stacking mode, these controls also being fully described in the copending application Ser. No. 645,639.

The sprocket wheel 222 is rigidly mounted on the end of the shaft 206 by a set screw 216 (FIGURES 5 and 6). A bearing 218 is supported on the underside of the table top 11 by a plurality of screws such as the screws 220 (FIGURE 6). The bearing 218 is coaxial with the cam shaft 206, and it provides a bearing surface for the cam 204. A chain drive is coupled to the sprocket wheel 222 in a manner to be described to produce rotation of the cams 204, 208 and 210. A lever arm 224 (FIGURES 4 and 5) is pivotally mounted on the underside of the table top 11 on a pivot shaft 226. The shaft 40 which supports the stack head 20 extends upwardly from one end of the lever arm 224 and through a slot 42 in the table top 11.

A cam follower 228 is rotatably mounted on the lever arm 224 at an intermediate point on the arm between the pivot shaft 226 and the end of the arm remote from the actuating shaft 40. The cam follower 228 is adapted to ride on the peripheral edge of the cam 204. A second lever arm 230 (FIGURES 4 and 9) is pivotally mounted on the pivot shaft 232 at the other side of the cam 204. The lever arm 230 has a cam follower 234 rotatably mounted at an intermediate point on the arm between the pivot shaft 232 and the upper end of the arm in FIGURE 4. A coil spring 236 is connected between the ends of the lever arms 224 and 230 in FIG- URE 4, and this spring biases the cam followers 228 and 234 against the peripheral edge of the cam 204.

Figure 4:
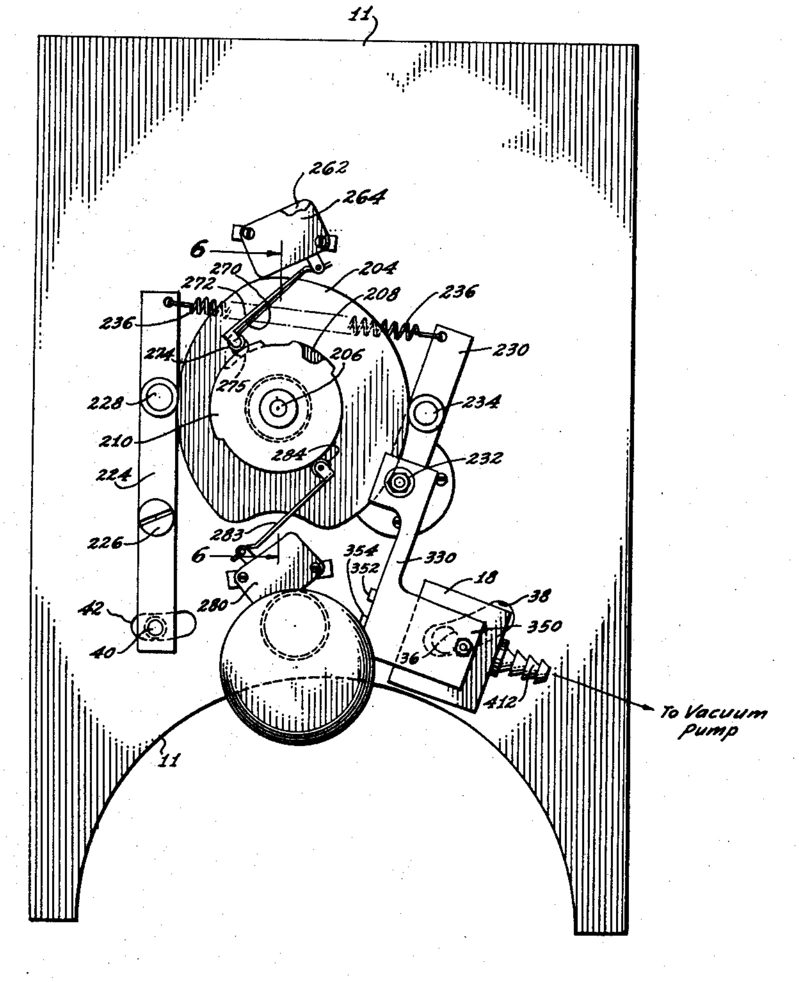

The cam 204 is shaped so that in one angular position it shifts the lower end of the lever arm 224 in FIGURE 4 to the left in the slot 42 and the lower end of the lever arm 230 to the left in a slot 38 in the table top. In a second angular position of the cam 204, the cam moves the lower end of the lever arm 224 in FIGURE 4 to the right in the slot 42 and it moves the lower end of the lever arm 230 to the right in the slot 38.

The view of FIGURE 5 shows the lever arm 224, and the pivot shaft 226 for this arm. The pivot shaft 226 extends through the table top 11, and it is held in place by a nut 250 which is threaded to the end portion of the shaft 226 projected above the table top. A pair of washers 252 and 254 are respectively interposed between the nut 250 and the lever arm 224, and between the top and bottom surfaces of the table top 11. The lever arm 224 is secured to the shaft 226 by a screw 256 which extends through the shaft. The head of this screw engages a tubular central portion of the lever arm 224, and the screw is held in place by a nut 258 and an associated elastic stop nut 260.

The switches 262 and 264 may be mounted on the underside of the table top 11 by means of a mounted bracket 266 (FIGURE 5). The mounting bracket is secured to the table top by a cap screw 268, and the switches are secured to the mounting bracket by a fillister screw 269.

The switches 262 and 264 have respective actuating arms 270 and 274. A pair of cam followers 274 and 276 are rotatably mounted on the respective ends of the arms 270 and 272. The cam followers 274 and 276 are adapted respectively to engage the cams 210 and 208. The arms 270 and 272 are spring biased in a direction to bias the cam followers 274 and 276 against the peripheral edge of the cams 208 and 210. Detents are formed in the peripheral surfaces of the cams 208 and 210 at selected angular positions, in order that the switches 262 and 264 may be actuated in correspondence with selected angular positions of the cam 204.

A third switch 280 (FIGURES 4 and 5) may be mounted on the underside of the table top 11 by a mounting bracket 282. This latter switch is positioned on the opposite side of the cam 210 from the switch 262. The switch 280 has an actuating arm 283 which is spring biased to urge the cam follower 284 against the periphery of the cam 210, the cam follower 284 being rotatably mounted at the end of the switch actuator 282.

The sprocket wheel 222 which drives the cam mechanism is coupled to a drive motor 300. The drive motor is keyed through a coupler 302 (FIGURE 5) to an overriding clutch mechanism 304. The clutch 304, in turn, is coupled to a sprocket wheel 306. The drive chain 310 couples the sprocket 306 to the sprocket 222. When the clutch 304 is engaged, the motor 300 drives the sprocket 306 which, in turn, drives the sprocket 222 to rotate the cams 204, 208 and 210.

Details of the clutch mechanism are shown more clearly in FIGURES 7 and 8. The motor 300 has a drive shaft 312 to which a cylindrical collar 314 is mounted by means, for example, of a stud 315. The collar 314 forms a portion of the coupler 302, and the collar is keyed to a first portion 316 of the clutch 304 by means, for example, of a key 317 (FIGURE 5). When the clutch is disengaged, the portion 316 is freely rotated by the motor 300, and this portion rotates with respect to a second portion 318 of the clutch. The second portion is keyed to a drive shaft 320 on which the sprocket 306 is mounted as by a set screw 322. Rotation of the section 318 of the clutch produces a rotation of the sprocket 316 which, in turn, causes the chain 310 to drive the sprocket 322 of the cam mechanism. Such rotation of the mechanism is realized when the clutch is engaged. The clutch mechanism is enclosed in a housing 324 (FIGURE 4) and this housing is mounted on the underside of the table top 11 by means of a bracket 326. This bracket is welded to the upper side of the table top and to the housing 324.

The housing 324 also serves as a support for the motor 300, the motor being mounted to the end of the housing by nuts 328 which are threaded to studs extending from the motor through the lower end of the housing. A U-shaped bracket 330 (FIGURE 7) is secured to the inside of the housing 324 by a pair of screws 332 and 334. The bracket 330 is mounted on one side of the clutch mechanism 304, and it serves to support a solenoid 336. The solenoid 336 is positioned so that its longitudinal axis extends substantially parallel to the rotational axis of the motor 300 and of the clutch 304.

The solenoid 336 has an armature 338 which extends through one end of the U-shaped bracket 330 when the solenoid is not energized. When the solenoid is energized, the armature 338 is retracted against the compression with a spring 340. The solenoid is held in the U-shaped bracket by a screw 342 extending through the other end of the bracket and into the end of the solenoid.

The clutch 314 may be of the type commonly referred to as a "Hilliard" clutch. The clutch includes a release bracket 344 which is mounted on top of the section 318 in coaxial relation with the axis of rotation of the clutch. The bracket 344 has a pair of radial ears 349 (FIGURE 8) positioned diametrically opposite each other. A pair of screws 346 and 348 extend through respective slots 350 and 351 in the release bracket 344 and into the section 318 of the clutch.

One ear of the bracket 344 normally engages the end of the solenoid armature 338 which protrudes through the bracket 330 (FIGURES 7 and 8) to hold the clutch mechanism in a released condition. When the solenoid is energized to retract the armature 338, the armature releases the bracket 344 so that the section 318 of the clutch is rotated by the section 316. If the solenoid is energized only for an extremely short interval, the armature is released in time to be engaged by the diametrically opposite ear into the bracket 344 so that the bracket only makes ½ a revolution and the section 318 is again freed from rotation by the section 316. This means that if the solenoid 336 is pulsed, the cam mechanism is driven through 180° for each pulsing operation.

The cam 204 is shaped so that a first ½ revolution brings the stack head 20 to an operative position and the feed head 18 to a stand-by position. The next ½ revolution of the cam then returns the stack head to a stand-by position and brings the feed head to its operative position.

As more clearly shown in FIGURE 9, a valve assembly 400 is supported on the lever arm 230. The valve assembly 400 is instrumental in supplying vacuum pressure to the card-engaging surface 18' of the feed head 18 at certain times and for supplying a positive pressure to that surface at other times, for the reasons described above.

When the apparatus is conditioned for stacking, it is desirable that the pressure to the surface 18' of the feed head be shut off. This is required, as pointed out above, so that the vacuum or pressure feed lines can be used in common with other card holding stations without vacuum pressure or positive pressure being lost through the feed head 18, regardless of the condition of the valve 400. It is desirable to prevent any disturbance in the movement of cards on the transport means 16 or in the positioning of cards in the card holder 10 from being created by the production of a vacuum or a pressure in the feed head 18.

Whenever the feed head 18 is retracted to the back of the slot 38 (FIGURE 3) and into its stand-by position, an internal mechanically operated valve in the feed head functions to close the passageway to the apertured card-engaging surface 18'. Then when the feed head is returned to its operating position, the internal valve automatically opens the passageway.

The feed head 18 is rotatably mounted on its pivot shaft 36 (FIGURES 3, 9 and 10), and it has a stud 401 which extends into a slot 402 (FIGURE 3) in the table top 11. The slot 402 is shaped and positioned so that, as the feed head 18 is retracted by the pivot shaft 36 in the slot 38, the stud 401 moves in the slot 402 to rotate the feed head 18 about the pivot shaft 36.

A detent wheel 404 is rotatably mounted on the pivot shaft 36 and is mechanically coupled to a portion of the valve assembly 400, as will be described in detail. A cap screw 406 is threaded into the feed head 18 and engages a detent in the wheel 404. Then, as the feed head is moved in the slot 38, its resultant rotation with respect to the shaft 36 by the stud 401 in the slot 402 causes the detent wheel 404 to rotate on the shaft.

As shown in FIGURE 10, the valve assembly 400 has an exhaust port 504 which extends upwardly from an internal chamber in coaxial relationship with the axis of the assembly. The exhaust port 504 has a valve seat 503 at its upper end. The exhaust port communicates with a lateral common chanel 505 which extends in a radial direction from the center of the assembly.

A first inlet port 507 extends into the assembly, and this inlet port terminates in a valve seat 509 in facing spaced relationship with the valve seat 503 of the exhaust port 504 on the opposite side of the common channel 505. Therefore, the inlet port 507 also communicates with the common channel 505. This inlet port is intended to be coupled to a suitable vacuum pressure source. The valve assembly also has an inlet port 506 and is intended to be coupled to an appropriate pressure fluid source, such as an air pump.

In a manner to be described, the exhaust port 504 is opened in one operating condition of the valve and the vacuum pressure inlet port 507 is closed. For this operating condition, the air pressure from the inlet port 506 is passed to the common channel 505. The air pressure is fed to the feed head 18, in a manner to be described, to produce a positive pressure at the apertured card-engaging surface 18' of the feed head. For the second operating condition of the valve, the exhaust port 504 is closed, and the inlet port 507 is opened. For this latter operating condiiton, a vacuum pressure is introduced to the common channel 505 to provide a vacuum pressure at the card-engaging surface 18' of the feed head 18 in a manner also to be described.

The valve assembly 400 includes a cylindrical shaped permanent magnet member 510 which is composed, for example, of Alnico V. The permanent magnet member 510 is longitudinally magnetized. A first disc-shaped pole piece 512 is secured to one end of the permanent magnet 510, and this pole piece has an elongated integral central portion **512*a*. The central portion 512*a* of the pole piece extends upwardly into the cylindrical permanent magnet 510 in coaxial relation with the permanent magnet, and this portion protrudes through the opposite end of the permanent magnet from the pole piece 512. The pole piece 512 and its central portion 512*a*** may be composed, for example, of soft steel.

A second disc-shaped pole piece 514 is mounted against the other end of the cylindrical permanent magnet 510, and this latter pole piece may also be composed of soft steel. The pole piece 514 has a central aperture through which the portion **512*a* of the pole piece 512 extends. The pole piece portion 512*a* and the pole piece 514 define an annular air gap 516** in which magnetic flux is produced.

The pole pieces 512 and 514 are held against the opposite ends of the cylindrical permanent magnet 510 by means of a plurality of screws such as the screw 518. These screws may be composed, for example, of a non-magnetic material such as brass and they extend longitudinally through the permanent magnet 510 from one of the pole pieces to the other.

The outer surface of the pole piece 514 has an annular channel formed near its periphery, and a metallic ring-like member 520 composed of a non-magnetic substance, such as brass, is mounted in the annular channel. The member 520 is firmly secured to the pole piece 514 as by brazing. The member 520 has a peripheral channel formed in its rim, and this latter peripheral channel supports a resilient O-ring seal 522. This O-ring serves as an air-tight seal for the valve assembly.

A disc-like resilient spider 524 is adapted to be mounted on the ring-like member 520 to extend across the area circumscribed by that member. The spider 524 may be composed, for example, of Phosphor bronze or other suitable resilient material. The spider is shaped to have a configuration shown in FIGURE 11 which permits relatively unimpeded longitudinal flexure and prevents any radial motion of the spider.

A cylindrical valve housing 526 composed, for example, of a non-magnetic material, such as aluminum, encloses the resilient spider 524. This housing has a shoulder portion 528 which engages the annular edge of the outer surface of the ring-like member 520 to sandwich the resilient spider 524 between the shoulder portion and the ring-like member. The spider is firmly held in position by the shoulder portion 528 and by the ring-like member 520. The valve housing 526 has an integral skirt portion 530 which extends axially over the rim of the ring-like member 520 and over the O ring seal 522, and into a countersunk peripheral portion 532 of the pole piece 514.

The valve housing 526 is firmly held in place by means of a plurality of screws 534 which extend radially through its integral skirt portion 530, these screws being threaded into the soft steel pole piece 514. The O-ring seal 522 is compressed between the skirt 530 and the rim of the ring-like member 520 to form a fluid-tight seal.

The valve housing 526 has a disc-like cover portion 536 which also may be composed of aluminum. The cover has an annular channel 538 formed in its inner surface. A resilient O-ring seal 540 is placed in the channel 538. The cover is held in place by a plurality of screws such as the screw 542. These screws extend axially through the cover and are threaded into the housing 526. When the screws are tightened, the O-ring 540 is compressed to form a fluid-tight seal between the cover 536 and the housing 526.

The inlet 506, referred to previously as being coupled to a source of pressure fluid, is formed in the valve housing 526, and this inlet port extends radially through the valve housing. The cover 536 has a central opening extending into its inner face and the exhaust port 504 extends through that opening in coaxial relationship with the cylindrical permanent magnet 510 and pole piece portion **512*a*. The exhaust port 504 is tubular in form and it may be composed of a non-magnetic material, such as brass. The resilient valve seat 503 composed, for example, of rubber is formed on the upper end of the tubular exhaust port 504**, as mentioned above.

A second tubular exhaust port 554 may extend through a central aperture in the elongated portion **512*a* of the pole piece 512. This latter exhaust port may function as a bleeder for the pressurized fluid introduced through the inlet port 506, when the exhaust port 504** is closed. However, for most applications, this port will not be required.

The tubular exhaust port 554 is axially aligned with the exhaust port 504, and it has a lower end portion 556 extending through the pole piece 512. This lower end portion is attached to the pole piece 512 by means of a nut 558.

A valve closure member 566 in the form of a two-sided double-acting poppet valve is precisely centered within the housing by a connecting rod 567 which extends through the exhaust portion 504 and connects with the spider 524. The spider serves to accurately center the closure member 566 within the housing, and to move the closure member up and down in an axial reciprocal manner in FIGURE 10. When the closure member is moved downwardly in FIGURE 10, one side of that member closes with the valve seat 503 of the exhaust port 504 to form a fluid-tight seal. Conversely, when the closure member is moved upwardly in FIGURE 10, the other side of the closure member closes with the valve seat 509 to form a fluid-tight seal. It will be apparent that when the closure member 566 is in its upper position the exhaust port 504 comunicates with the common channel 505, and when the closure member 566 is in its lower position, the inlet 507 communicates with the common channel 505.

A coil spring 569 surrounds the connecting rod 567 in coaxial relationship with the rod. This spring bears against the inner face of the cover 536 at its upper end, and the spring bears against the spider 524 at its lower end. The spring is disposed under compression so as to resiliently bias the spider 524 downwardly in FIGURE 10 to urge the closure member 566 against the valve seat 503.

A cylindrical coil form 568 is fastened to the connecting rod 567, and the coil form is accurately centered by the spider 524 in coaxial relationship with the cylindrical permanent magnet 510 and the pole piece portion **512*a* to extend into the annular air gap 516. The coil form 568 is so dimensioned and so centered that it extends into the annular air gap out of contact with the disc-shaped pole piece 204, and out of contact with the portion 212*a* of the pole piece 212**.

A portion of the peripheral surface of the coil form 568 is recessed, and an electric winding 570 is wound about the coil form 568 in the recessed portion. One end of the winding 570 is connected to a first electrical terminal 572 mounted on the housing 526 in sealed relation with the housing. This terminal has an eyelet portion at its inner end within the valve housing, and the eyelet portion is soldered or otherwise electrically connected to the winding 570. A second electrical terminal 576 mounted in sealed relationship with the housing 526 is electrically connected to the other end of the winding 570. The second terminal also has an eyelet portion at its inner end within the housing, and the eyelet portion is soldered or otherwise connected to the second end of the winding 570.

Because of the inclusion of the cylindrical permanent magnet 510, a magnetic flux is induced in a magnetic path including the permanent magnet and the pole pieces 512 and 514. This flux causes a pole face to be produced in the pole piece 514 at a position contiguous to the coil form 568. The polarity of the pole face is dependent upon the orientation with which the permanent magnet 210 is positioned in the magnetic circuit. For purposes of subsequent discussion, a pole face having a north polarity will be considered as being produced in the pole piece 514 at a position adjacent the coil form 568, and a pole face having a south polarity will be considered as being produced in the pole piece portion **512*a*. Therefore, radial lines of flux will cross the annular air gap from the pole piece portion 512*a* to the pole piece 514**.

At certain times, electric pulses may be introduced to the winding 570 on the coil form 568 by way of the terminals 572 and 576. The resulting current through the winding produces a magnetic flux around the individual turns which reacts with the radial flux in the annular air gap 516 to cause the winding 570 and the coil form 568 to move axially within the annular air gap 516.

Therefore, when control pulses of a first polarity are introduced to the winding 570, the resulting current flow in this winding causes the coil form 568 to move downwardly in FIGURE 5 to seat the closure member 566 against the valve seat 503. Alternately, when control pulses of the opposite polarity are introduced, the coil form 568 is caused to move upwardly in the air gap 516 so as to seat the closure member 566 against the valve seat 509.

When a pulse introduced to the winding 570 has a polarity to cause the coil form 568 to move downwardly in FIGURE 5 to seat the closure member 566 against the valve seat 503, the spring 569 holds the closure member down in this position after the termination of the triggering pulse in the winding 570.

Likewise, the subsequent introduction of an opposite polarity pulse in the winding causes the closure member 566 to seat against the valve seat 509. The vacuum pressure through the inlet port 507 securely holds the closure member 566 in this position against the force exerted by the spring 169 after the termination of the opposite polarity triggering pulse.

As noted previously, the switch assembly may be operated at an extremely rapid rate, with current pulses of one polarity causing the closure member 166 to snap down on the valve seat 103, and with current pulses of the opposite polarity causing the closure member 566 to snap against the valve seat 109. This actuation of the closure member 566 causes a rapid reversal at the card-engaging surface 18' of the feed head 18 from a vacuum pressure to a positive pressure.

It will be noted that the current pulses of one polarity serve to bring the closure member 566 into the proximity of the valve seat 509 and under the influence of the vacuum pressure at the inlet port 107. As soon as the closure member is brought sufficiently under the influence of this vacuum pressure, that pressure serves to securely draw the closure member against the valve seat 509 and to hold it there in a closed condition after the termination of the triggering pulse. Likewise, a triggering pulse of the opposite polarity serves to draw the closure member 566 away from the valve seat 509 and out of the influence of the vacuum pressure through the port 507. The closure member now comes under the influence of the spring 569, which draws it securely down on the valve seat 503 and holds it against that valve seat after the terminal of the opposite polarity triggering pulse. A bias current is usually required to hold the valve up on the valve seat 509. This is due to the fact that the force of the spring 569 increases as the closure member is moved upward and the spring compresses since the tendency of the spring is to move the closure member down from the valve seat 509, this bias current is needed to hold it up.

The pivot shaft 136 referred to previously is a hollow shaft and, as shown in FIGURE 10, this hollow shaft is in axial alignment with an exhaust port 442 of the valve assembly. A passageway 444 extends upwardly through the shaft 36 in axial alignment with the exhaust port 442 and communicates with that port. The exhaust port 442, in turn, communicates with the radial passageway 505.

A valve guide 450 is mounted on top of the exhaust port 442, and the guide surrounds the shaft 36. The valve guide 450 extends through the slot 38 in the table top 11 and moves in that slot. The valve guide 450 also extends into the lower face of the feed head 18. An O ring 462 is disposed between the valve guide 450 and the feed head to function as a seal. A further O ring seal 461 is mounted on the shaft 36 in a socket near the top, and this ring is held in place by the detent member 404.

The valve guide 450 has a pair of diametrically positioned chambers 466 and 467 adjacent respective ones of a pair of ports 446 and 448 in the shaft 36. The chambers 466 and 467 of the valve guide 450 communicates with a radial passageway 470 in the feed head 18. The radial passageway 470 extends to a chamber 480 (FIGURES 12 and 14) in the feed head adjacent the card-engaging surface 18' of the feed head. The card-engaging surface 18' has a series of orifices such as the orifice 481 extending through it into the chamber 480.

When the feed head is moved between its operative and its stand-by position, the stud 401 as explained above causes the feed head to rotate with respect to the valve guide 450 which is moving in the slot 38 in the table top 11. This rotation of the feed head is transmitted by the screw 462 to the detent wheel 404. The detent wheel is affixed to the shaft 36 so that the shaft 36 is made to rotate with respect to the valve guide 450.

As best shown in FIGURE 13, when the assembly is moved to its operative position, the relative positions of the shaft 36 and the valve guide 450 are such that the ports 446 and 448 communicate respectively with the chambers 466 and 467 so that vacuum pressure may be produced at the card-engaging surface 18' of the feed head 18 in one operating condition of the switch assembly 400, and so that a positive pressure may be produced at that surface for a second operating position of the switch assembly.

Now when the assembly is moved to its stand-by position of FIGURE 12, the shaft 36 and the guide 450 assume relative positions, as shown in that figure. In these latter relative positions, the ports 446 and 448 do not communicate with the chambers 466 and 467. Therefore, the path to the orificed card-engaging surface 18' of the feed head 18 is shut off. Therefore, regardless of the state of the switch assembly 400, no vacuum pressure or positive pressure can be established at the orificed surface 18'.

The invention provides, therefore, an improved feed head assembly in which a vacuum pressure may be introduced to the retaining surface of the feed head when the feed head is in its operative position. When such a vacuum pressure is introduced to that surface of the feed head, it serves to retain the cards in the card holding station. When a card is to be released from the station, a pulse of appropriate polarity is introduced to the terminals 572 and 576 of the valve assembly 400. This causes a positive pressure immediately to be produced at the retaining surface of the feed head so that the card is rapidly released. A pulse of the opposite polarity then returns the feed head to its retaining mode.

This, as discussed above, permits the card-engaging surface 18' of the feed head 18 to have a relatively high coefficient of friction. This, in turn, enables the cards to be satisfactorily retained by that surface without the need for excessively high vacuum pressures. Then, when a card is released, the resulting positive pressure at the card-engaging surface of the feed head overcomes the frictional effects and the released card is rapidly withdrawn from the station of the transport medium without any undesired frictional drag being exerted on the card of the feed head.

Regardless of the condition of the retaining surface of the feed head, the removal of the feed head to its stand-by position causes the vacuum pressure or positive pressure to be removed from that surface in the described manner. This feature, as also noted above, permits a common pressure source and a common vacuum source to be used with a multiplicity of individual card holding stations.

It should be appreciated that the imposition of vacuum pressures and positive, greater-than-atmospheric pressures on the cards at different times can be provided in instrumentalities other than the card holder 10. For example, the imposition of such pressures at different times can be used in conjunction with a holding station such as disclosed and claimed in co-pending application Serial No. 689,347 filed October 10, 1957 in the names of Eric Azari, et al., now U.S. Patent No. 2,905,466.

Such a holding station is disposed in coupled relationship to transport means such as the drum 10. When a vacuum pressure is applied to the surface of the holding station, cards are retained by the holding station against movement by the drum. The subsequent imposition of a positive pressure on the surface of the holding station facilitates the rapid release of the cards for movement with the drum 16.

We claim:

1. In apparatus for processing data on a plurality of information storage cards as represented by signal indications on the cards, the combination of: a card holder for maintaining the cards in a stacked relationship, transport means for the cards and disposed in co-operative relationship with the card holder for providing a controlled transfer of cards from the card holder to the transport means, a feed head disposed in co-operative relationship with the cards in the card holder to obtain a controlled transfer of cards from the card holder to the transport means, a housing having first parts including a first inlet port for introducing pressurized fluid into the housing, a flexible spider supported across the housing for flexure in a direction transverse to the plane of support of the spider, a closure member supported by the spider for movement in accordance with the flexure of the spider and disposed in communicating relationship with the first ports for movement into co-operative relationship with the ports to close the ports, the housing having a second inlet port for introducing a vacuum pressure, the second inlet port being disposed on the opposite side of said closure member from the first ports and positioned to establish a co-operative relationship with the closure member, a common channel extending from the first ports and the second inlet port to the feed head, and actuating means operative upon the closure member for applying an instantaneous force to the closure member for a movement of the closure member into cooperative relationship with the first ports for one operating condition to supply a vacuum pressure through the common channel to the feed head and to move the closure member into co-operative relationship with the second inlet port for a second operating condition to supply pressurized fluid through the common channel to the feed head for facilitating the transfer of cards from the card holder to the transport means.

2. The combination defined in claim 1 in which said actuating means is responsive to electrical pulses of one polarity to provide the instantaneous force for moving the closure member into cooperative relationship with the first ports and is responsive to electrical pulses of a second polarity to provide the instantaneous force for moving the closure member into cooperative relationship with the second port.

3. In apparatus for processing data on a plurality of information storage cards as represented by signal indications on the cards, the combination of: a card holder for maintaining the cards in a stacked relationship, transport means for the cards and disposed in operative relationship to the cards in the card holder to provide a transfer of cards from the card holder to the transport means, a feed head disposed in coupled relationship to the cards in the card holder to provide a controlled transfer of cards from the card holder to the transport means, means including a magnetic means for providing an air gap and for developing a magnetic flux in the air gap, an electrical winding dimensioned to extend into the air gap, a housing surrounding the winding, means including a first inlet port extending into the housing for introducing pressurized fluid into the housing, an exhaust port extending through the housing and having a first valve seat at one end thereof, means including a second inlet port extending into the housing for introducing a vacuum pressure and having a second valve seat spaced from the first valve seat, a common channel extending from the exhaust port and the second inlet port to the feed head, and means including a closure member mechanically coupled to the winding and positioned between the first valve seat and the second valve seat for a closure with the first valve seat in response to a first electric current of one polarity through the winding to obtain the introduction of pressurized fluid into the feed head to prevent cards from being transferred to the transport means and for a closure with the other of the valve seats in response to a second electric current through the winding of opposite polarity to the first current to facilitate the introduction of a vacuum pressure into the feed head to facilitate the transfer of cards from the card holder to the transport means.

4. In apparatus for processing data on a plurality of information storage cards as represented by signal indications on the cards, the combination of: a card holder for maintaining the cards in a stacked relationship, transport means for the cards and disposed in a particular relationship to the card holder to provide a transfer of cards from the card holder to the transport means, a feed head disposed in coupled relationship with the cards in the card holder for obtaining a controlled transfer of cards from the card holder to the transport means, means including magnetic means for providing an air gap and for developing a magnetic flux in the air gap, an electric winding disposed to extend into the air gap, a housing surrounding the winding and the coil form, first port means including a first inlet extending through the housing and having a valve seat at one end thereof and disposed to introduce pressurized fluid into the housing, a second inlet port for introducing a vacuum pressure and having a valve seat spaced from the valve seat of the first port means, a common channel extending to the feed head and disposed ot communicate with the second inlet port at particular times for the application of vacuum pressure to the feed head and to communicate with the first port means at particular times for the application of the pressurized fluid to the feed head, a flexible spider supported across the housing for flexure in a direction transverse to its plane of support, a closure member positioned between the valve seat of the first port means and the valve seat of the second inlet port to engage one of the valve seats in accordance with its positioning, and a connecting rod extending between the closure member and the spider to obtain a movement by the closure member against one of the valve seats in response to a first electric current of one polarity through the winding and to obtain a movement by the closure member against the other of the valve seats in response to a second electric current through the winding of opposite polarity to the first current.

5. The combination defined in claim 4 and which includes a coil spring surrounding the connecting rod and interposed between the spider and the first port means for biasing the closure member in the direction of the valve seat of the first port means.

6. A valve assembly for producing a vacuum pressure in one operating condition and for producing a pressurized fluid in a second operating condition, said valve assembly including: a housing having first ports including a first inlet port for introducing pressurized fluid into the housing, a closure member, resilient means for supporting the closure member in contiguous relationship with the first ports for movement into cooperative relationship with the first ports to close the first ports, the housing having a second inlet port for introducing a vacuum pressure, the second inlet port being disposed on the opposite side of said closure member from the first ports and positioned to establish a cooperative relationship with the closure member, a common channel extending from the first ports and the second inlet port, and actuating means operative upon the closure member for applying an instantaneous force to the closure member to move the closure member into cooperative relationship with the first ports for a closure of the first ports for one operating condition and for the introduction of a vacuum pressure to the common channel and to move the closure member into cooperative relationship with the second inlet port for a second operating condition for the closure of the second inlet port and for the introduction of pressurized fluid to the common channel.

7. A valve assembly for producing a vacuum pressure in one operating condition and for producing a pressurized fluid in a second operating condition, said valve assembly including: a housing having a first inlet port for introducing pressurized fluid into the housing, a flexible spider supported across the housing for flexure in a direction transverse to the plane of the support of the spider, means supported in the housing on one side of the spider to provide an exhaust port, a closure member centered by the spider for movement in accordance with the flexure of the spider and disposed in contiguous relationship with the exhaust port, the housing having a second inlet port for introducing a vacuum pressure, the second inlet port being disposed on the opposite side of the closure member from the exhaust port in contiguous relationship with the closure member, a common channel extending from the exhaust port and from the second inlet port, actuating means operative upon the closure member for applying an instantaneous force to the closure member to move the closure member into cooperative relationship with the exhaust port to close the exhaust port for one operating condition for the production of a vacuum pressure in the common channel and to move the closure member into cooperative relationship with the second inlet port for a second operating condition to close the second inlet port for the introduction of a pressurized fluid to the common channel.

8. The combination defined in claim 7 in which said actuating means is responsive to electrical pulses of one polarity to move the closure member into cooperative relationship with the exhaust port and is responsive to electrical pulses of a second polarity to move the closure member into cooperative relationship with the second inlet port.

9. A valve assembly for producing a vacuum pressure in one operating condition and for producing a pressurized fluid in a second operating condition, said valve assembly including: a permanent magnet for providing an annular air gap and for developing a magnetic flux in the air gap, a cylindrical coil form dimensioned to extend into the air gap, an electric winding disposed on the coil form, a housing surrounding the winding and the coil form, a first inlet port for introducing pressurized fluid into the housing, an exhaust port extending through the housing in coaxial relationship with the air gap and having a valve seat at one end thereof, a second inlet port for introducing a vacuum pressure and having a valve seat facing and spaced from the valve seat of the exhaust port, a common channel extending from the exhaust port and from the second inlet port, and a closure member mechanically coupled to the coil form and positioned between the valve seat of the exhaust port and the valve seat of the second inlet port, said closure member being disposed relative to the valve seats to close with one of the valve seats in response to an electrical current of one polarity through the winding and to close with the other of the valve seats in response to an electrical current of opposite polarity through the winding.

10. A valve assembly for producing a vacuum pressure in one operating condition and for producing a pressurized fluid in a second operating condition, said valve assembly including: means including a permanent magnet constructed to provide an air gap and for developing a magnetic flux in the air gap, a winding disposed to extend into the air gap and disposed relative to the magnet for the exertion of a force upon the winding in accordance with the flow of current through the winding, a housing surrounding the winding, a first inlet port extending into the housing for introducing pressurized fluid into the housing, an exhaust port extending through the housing and having a valve seat at one end thereof, a second inlet port extending into the housing for introducing a vacuum pressure and having a valve seat facing and spaced from the valve seat of the exhaust port, a common channel disposed in the housing and extending from the exhaust port and from the second inlet port, a flexible spider supported across the housing for flexure in a direction transverse to its plane of support and affixed to the winding for movement in accordance with the force exerted on the winding and disposed on the same side of the first and second inlet ports and the exhaust port, and a closure member positioned between the valve seat of the exhaust port and the valve seat of the second inlet port and coupled to the spider for movement into engagement with one of the valve seats in response to a first electric current of one polarity through the winding and for movement into engagement with the other of the valve seats in response to a second electric current of opposite polarity through the winding.

11. A combination defined in claim 10 and which includes a coil spring interposed in constrained relationship between the spider and the exhaust port for biasing the closure member in the direction of the valve seat of the exhaust port.

12. In combination with the valve assembly set forth in claim 6, transport means for the cards, and a retainer having an orifice communicating with the common channel and operative upon the cards to retain the cards against transport upon the production of a vacuum pressure in the common channel and to facilitate such transport upon the passage of fluid through the common channel.

13. In combination with the valve assembly set forth in claim 7, transport means for the cards, and means coupled to the common channel for applying the vacuum pressure against the cards to prevent any transport of the cards and for applying the pressurized fluid against the cards to facilitate the transport of the cards.

14. In combination with the valve assembly set forth in claim 11, movable transport means constructed to provide a movement of the cards with the transport means, and means including an orifice disposed in communicative relationship with the common channel and in coupled relationship with the cards for applying the vacuum pressure against the cards to prevent any transport of the cards and for applying the pressurized fluid against the cards to facilitate the transport of the cards.

References Cited in the file of this patent

UNITED STATES PATENTS

| | | |
|---|---|---|
| 2,296,152 | Downing | Sept. 15, 1942 |
| 2,486,196 | Nebolsine | Oct. 25, 1949 |
| 2,538,972 | Magnani | Jan. 23, 1951 |
| 2,842,362 | Hayes et al. | July 8, 1958 |
| 2,899,926 | Leibold | Aug. 18, 1959 |
| 2,901,247 | Orner | Aug. 25, 1959 |
| 2,905,465 | Armstrong et al. | Sept. 22, 1959 |